(12) United States Patent  
Nimri

(10) Patent No.: US 7,589,757 B2  
(45) Date of Patent: Sep. 15, 2009

(54) SYSTEM AND METHOD FOR EXCHANGING CONNECTION INFORMATION FOR VIDEOCONFERENCING UNITS USING E-MAILS

(75) Inventor: Alain Nimri, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 707 days.

(21) Appl. No.: 11/277,967

(22) Filed: Mar. 30, 2006

(65) Prior Publication Data

US 2007/0263074 A1 Nov. 15, 2007

(51) Int. Cl.
*H04N 7/14* (2006.01)
*G06F 15/16* (2006.01)

(52) U.S. Cl. ............... 348/14.08; 348/14.12; 348/14.01

(58) Field of Classification Search ... 348/14.01–14.16; 379/93.24, 93.25, 202.01; 370/260–261; 709/204–206
See application file for complete search history.

(56) References Cited

U.S. PATENT DOCUMENTS

| | | | | |
|---|---|---|---|---|
| 6,924,831 B2* | 8/2005 | Huang | ...................... | 348/14.12 |
| 7,353,251 B1* | 4/2008 | Balakrishnan | ............... | 709/204 |
| 2004/0148406 A1* | 7/2004 | Shima | ........................ | 709/228 |
| 2006/0179114 A1* | 8/2006 | Deeds | ........................ | 709/206 |
| 2007/0192427 A1* | 8/2007 | Berstis et al. | ............... | 709/207 |

* cited by examiner

*Primary Examiner*—Melur Ramakrishnaiah
(74) *Attorney, Agent, or Firm*—Wong, Cabello, Lutsch, Rutherford & Brucculeri, LLP

(57) ABSTRACT

A videoconferencing system includes a first videoconferencing unit coupled to a network and associated with a first e-mail address. The first videoconferencing unit receives a second e-mail address and automatically sends a request e-mail requesting connection information to the second e-mail address. A second videoconferencing unit is coupled to the network and is associated with the second e-mail address. The second videoconferencing unit receives the request e-mail and automatically returns a response e-mail including connection information to the first e-mail address. The first videoconferencing unit receives the response e-mail and automatically obtains the connection information from the response e-mail. Using the connection information, the first videoconferencing unit initiates a videoconference call with the second videoconference unit.

22 Claims, 3 Drawing Sheets

SYSTEM AND METHOD FOR EXCHANGING CONNECTION INFORMATION FOR VIDEOCONFERENCING UNITS USING E-MAILS

CROSS-REFERENCE TO RELATED APPLICATIONS

This application is filed concurrently with U.S. patent application Ser. No 11/277,979 entitled "System and Method for Exchanging Connection Information for Videoconferencing Units Using Instant Messaging," which is hereby incorporated herein by reference in its entirety.

FIELD OF THE DISCLOSURE

The subject matter of the present disclosure relates to a system and method for exchanging connection information for videoconferencing units using e-mails.

BACKGROUND OF THE DISCLOSURE

Videoconferencing systems use Internet Protocol (IP) addresses to establish connections between them. When the IP address is not fixed, users may find it difficult to find and dial each participant's IP address to establish the videoconference. For example, a user may have to access a directory server and obtain the current IP addresses for potential participants of the videoconference. Alternatively, the user may have to call each participant to obtain his or her IP address over the telephone. The user must then manually enter the current IP addresses into the user's videoconferencing system to initiate videoconference calls to the potential participants.

The subject matter of the present disclosure is directed to overcoming, or at least reducing the effects of, one or more of the problems set forth above.

SUMMARY OF THE DISCLOSURE

A videoconferencing system includes a first videoconferencing unit and one or more second videoconference units coupled to one or more networks. The first videoconferencing unit is associated with a first e-mail address, and the one or more second units are associated with one or more second e-mail addresses. A user at the first videoconferencing unit enters one or more of the second e-mail addresses as potential participants in a videoconference call. For example, the user can manually enter the e-mail addresses or access them in an address book database that is part of the videoconferencing unit. Once e-mail addresses have been entered, the first videoconferencing unit automatically configures request e-mails to request connection information from the second videoconferencing units having entered e-mail addresses. For example, the first videoconference unit constructs each request e-mail to include the first e-mail address of the first videoconferencing unit as the source of the e-mails, a second e-mail address of one of the second videoconferencing units as a destination, and an indication of what connection information is requested from the second videoconferencing unit. The connection information can includes, but may not be limited to, the Integrated Services Digital Network (ISDN), Internet Protocol (IP), or Session Initiation Protocol (SIP) address of the second videoconferencing unit. The address can be fixed, or it can change depending on how the second unit is assigned its videoconferencing address. The connection information can also be a number for an IP-to-IP Gateway. The requested connection information can also include information regarding encryption or authentication associated with the second videoconferencing unit.

Once the request e-mails are constructed, the first videoconferencing unit sends the request e-mails to the second e-mail addresses of the second videoconferencing units. In turn, the second videoconferencing units receive the request e-mails and parse the coded language of the request e-mail to determine what is requested. The second videoconferencing units then obtain the requested information, and each of the second units automatically constructs a response e-mail by including its second e-mail address as the source, the first e-mail address as the destination, and its ISDN address, IP address, SIP address, number for an IP-to-IP Gateway, or other connection information for establishing a videoconference call. The second videoconferencing units then send the response e-mails to the first e-mail address. The first videoconferencing unit receives the response e-mails and automatically obtains the connection information from the response e-mails by parsing the coded language and extracting the information. Using the connection information, the first videoconferencing unit then initiates videoconference calls with the second videoconference units.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
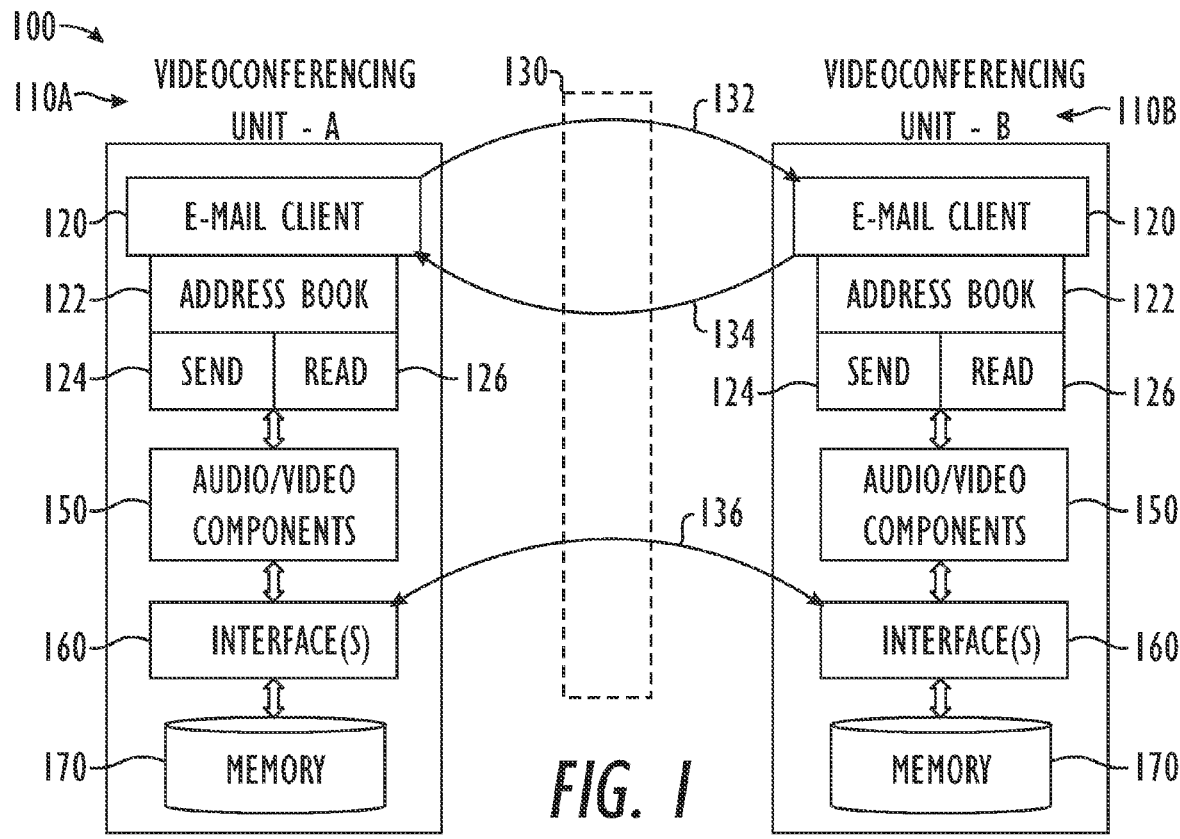
FIG. 1 illustrates an embodiment of a videoconferencing system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 134 U.S.C. § 112.

DETAILED DESCRIPTION

Referring to FIG. 1, a videoconferencing system 100 according to certain teachings of the present disclosure is schematically illustrated. The system 100 uses back-end e-mails 132 and 134 between a calling videoconference unit 110A and one or more recipient videoconference units 110B. The back-end e-mails 132 and 134 exchange current Integrated Services Digital Network (ISDN) address, Internet Protocol (IP) address, Session Initiation Protocol (SIP) address, number for an IP-to-IP Gateway, or any other connection information for establishing a videoconference call between the units 110A-B. The e-mails 132 and 134 can be handled by one or more e-mail servers 130 via the Internet, for example.

Each unit 110A-110B includes an e-mail application 120 as an internal component of its software. The e-mail application 120 has an address book function 122 and has send and read functions 124 and 126 for respectively sending and reading e-mails 132 and 134. The send function 124 for sending e-mails, although it can be initiated by the user, is preferably operated automatically by the e-mail application 120 of the unit 110. For example, the send function 124 preferably formats and configures appropriate information in an e-mail 132 or 134 and sends it to the specified recipient unit(s) 110. To configure the e-mail, the send function 124 can code the information using an appropriate language (e.g., Hypertext Markup Language or Extensible Markup Language) and can arrange the information in a predefined format known to the specified recipient unit(s) 110.

Likewise, the read function 126 for reading e-mails is preferably operated automatically by the e-mail application 120 of the units 110. For example, the read function 126 preferably retrieves appropriate information automatically from a received e-mail 132 or 134. To retrieve information from the e-mail, the send function 124 can parse the code of the e-mail 132 or 134 and can extract appropriate information from that parsed code.

The videoconferencing units 110 also include audio and video components 150, one or more network interface 160, and a database or memory 170. The memory 170 can store e-mail addresses and other contact information for the address book function 122. In addition, the memory 170 can store connection information and other details related to establishing a videoconference call with the associated videoconferencing unit 110. The audio and video components 150 can be those components known in the art for handling audio and video of a videoconference. For example, the audio and video components 150 can include software and circuitry for encoding, decoding, compressing, and decompressing audio and video signals for a videoconference session. Likewise, the network interface 160 can includes those components known in the art for handling communications 136 of a videoconference. Accordingly, the audio and video components 150 and the network interfaces 160 are not described in detail herein.

In FIG. 1, the e-mails 132 and 134 are shown being transmitted apart from the one or more network interfaces 160 for illustrative purposes. It will be appreciated that each unit 110 can have one interface 160 for handling e-mails 132 and 134 and another interface 160 for handling videoconference calls 136. Alternatively, it will be appreciated that each unit 110 can use the same network interface 160 for handling both e-mails 132 and 134 and videoconference calls 136. In one embodiment, one network interface 160 is used on each unit 110 for handling both e-mails 132 and 134 and videoconference calls 136 over the Internet.

Figure 2:
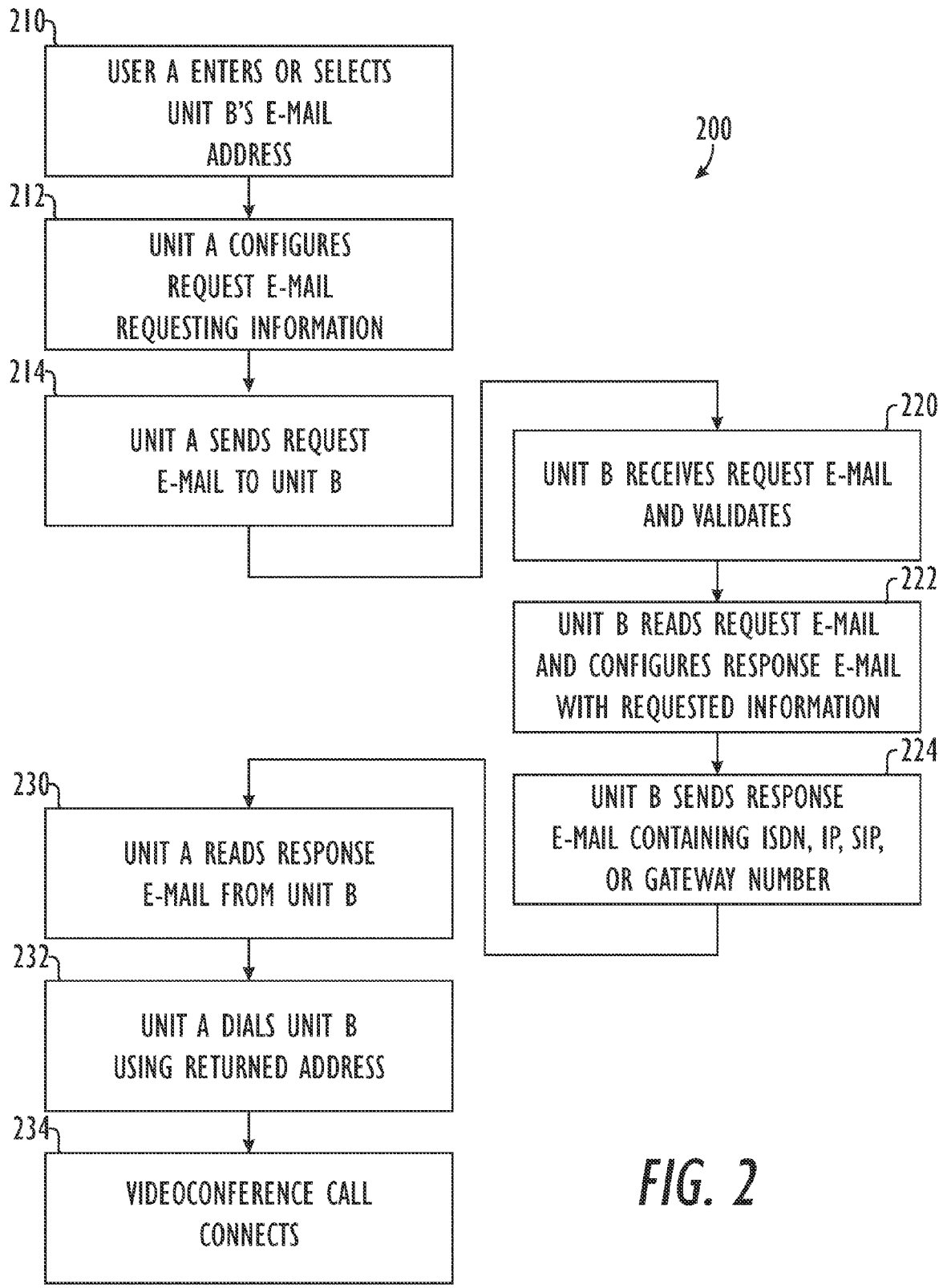
FIG. 2 illustrates a process of operation of the disclosed videoconferencing system.

Referring to FIG. 2, a process 200 of operation of the videoconferencing system is illustrated in flow chart form. (Element numerals of components in FIG. 1 are concurrently provided in the discussion of FIG. 2). In the discussion that follows, it is assumed that a user at a first videoconferencing unit 110A wants to establish a videoconference call with a user at a second videoconferencing unit 110B. Both units 110A and 110B have email applications 120 internal to their software, and each unit 110A and 110B has an assigned email address (e.g., "unitA@serverA.com" and "unitB@serverB.com").

Initially, user A initiates contact with user B by manually entering an e-mail address or by accessing a previously stored e-mail address stored in memory 170 of user A's unit 110A using the address book function 122 (Block 210). An example of a screen for initiating this contact is discussed below with reference to FIG. 3. Once user A has selected videoconference participants, videoconferencing unit 110A automatically configures an e-mail 132 requesting information for connecting with unit 110B (Block 212). As noted previously, the send function 124 automatically constructs the request e-mail 132 by arranging the requested information in a predefined format using an appropriate coding language for the e-mail 132. The requested information includes, but is not limited to, the ISDN address, IP address, SIP address, or number for an IP-to-IP Gateway of unit 110B.

After configuring the request e-mail 132, the first videoconferencing unit 110A sends the request email 132 to the second videoconferencing unit 110B using the previously entered or selected e-mail address (Block 214). An example of a request e-mail requesting information from a videoconferencing unit is discussed below with reference to FIG. 4. As noted above, the request e-mail 132 is handled using e-mail servers and other components known in the art.

After being sent, the second videoconferencing unit 110B receives the request e-mail 132 and validates the request for information (Block 220). The process of validation can be used when some customary safeguards are used by e-mail applications 120 of the units 110A and 110B. For example, the request e-mail 132 may have to pass any spam filters or other protective measures on the second videoconferencing unit 110B. Preferably, the second videoconferencing unit 110B is preconfigured to accept and recognize request e-mails 132 requesting information from the first videoconferencing unit 110A. In this way, the validation process performed at the second unit 110B can be simplified.

After validation, the second videoconferencing unit 110B automatically reads the request e-mail 132, obtains the requested information, and configures a response e-mail 134 with the connection information (Block 222). As noted previously, the read function 126 of the second unit 110B automatically parses the code of the request e-mail 132 and determines what information is requested. Then, the e-mail application 120 obtains the requested information from the unit's memory or database 170. Next, the send function 124 automatically constructs the response e-mail 134 by arranging the requested information in a predefined format using an appropriate coding language for the e-mail 134.

The second videoconferencing unit 110B then sends its response e-mail 134 back to the first videoconferencing unit 110A (Block 224). In addition to the ISDN address, IP address, SIP address, or number for an IP-to-IP Gateway, the response e-mail 134 can include other information relevant to establishing a videoconference with the second unit 110B. For example, the response e-mail 134 can include information about encryption and authentication that the first unit 110A may need to establish the connection with second unit 110B. An example of a response e-mail returning information to a videoconferencing unit is discussed below with reference to FIG. 5.

When the response e-mail 134 is received, the first videoconferencing unit 110A reads the response e-mail 134 to obtain the connection information (Block 230). Based on the connection information, the first videoconferencing unit 110A then dials or calls the second videoconferencing unit 110B (Block 232). Finally, the videoconference call is established as the first and second units 110A and 110B connect (Block 234).

Figure 3:
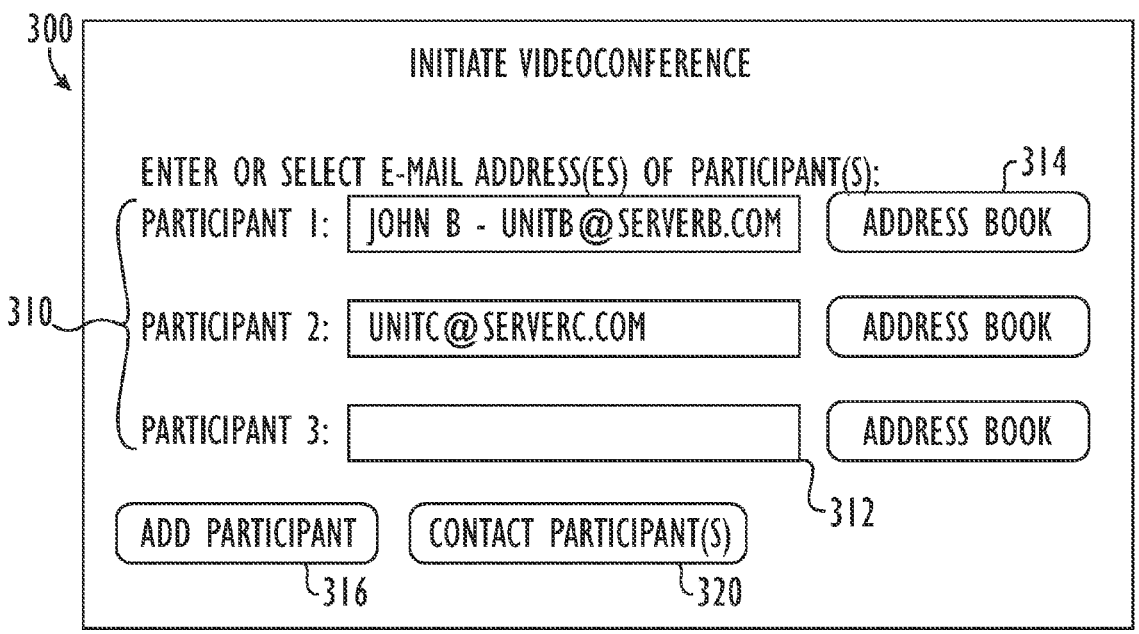
FIG. 3 illustrates an example of a screen for initiating a videoconference.

As discussed previously, a user at a videoconferencing unit can initiate contact with potential participants by entering or selecting e-mail addresses of other videoconferencing units. Referring to FIG. 3, an example of a screen 300 for entering or selecting e-mail addresses to initiate a videoconference is illustrated. In this screen 300, which is accessible using a user interface for a videoconferencing unit, the user can enter the e-mail addresses of one or more other videoconferencing units 310 with which the user wishes to initiate a videoconference. In one way, the user can manually enter an e-mail address for a videoconferencing unit 310 in one of the participant fields 312. In another way, the user can select an address book button 314 and access an address book screen (not shown) that lists various saved user names and associated e-mail addresses. By then selecting from the list, the participant field 312 in the screen 300 can be populated with the associated e-mail address of the selected videoconferencing unit 310. More videoconferencing units can be added by selecting an Add Participant button 316. When the user has selected all the desired videoconferencing units 310 to participate, the user can finish the selection process by selecting a button 320 to initiate back-end contact with the videoconferencing units 310. At this point, the user's videoconferencing unit composes and sends request e-mails to the e-mail addresses of the videoconferencing units 310.

Figure 4:
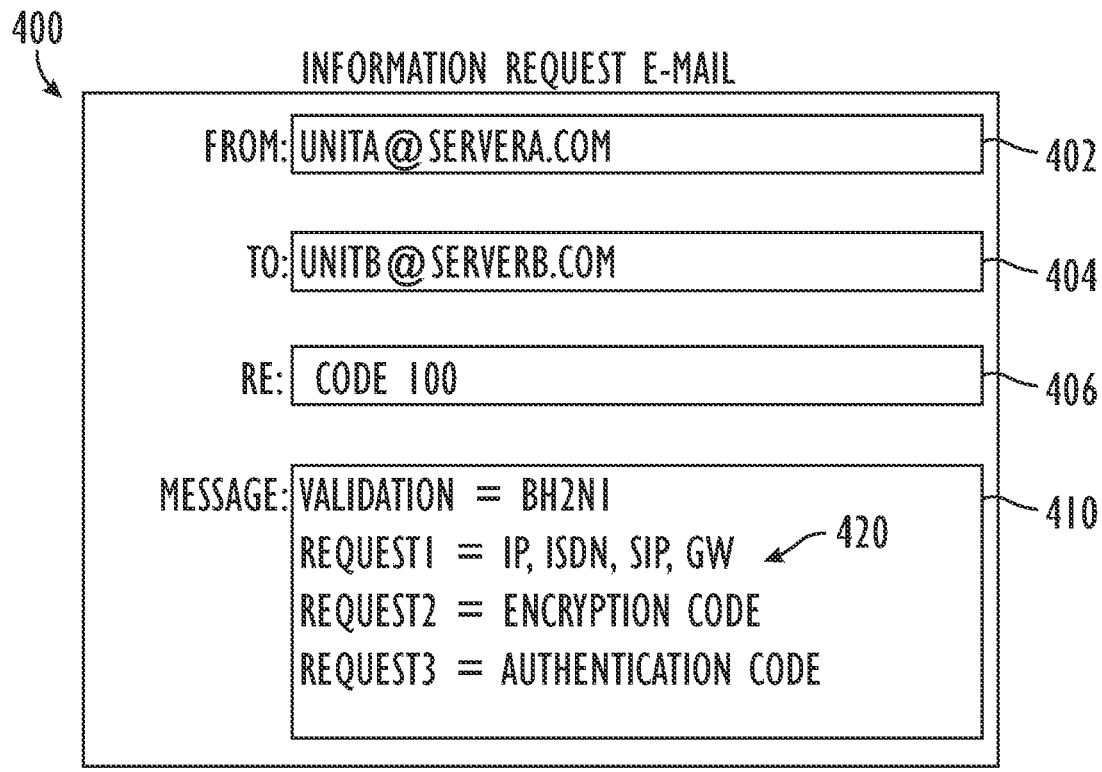
FIG. 4 illustrates an example of an e-mail requesting connection information from a videoconferencing unit.

As discussed previously, a request e-mail is sent from one videoconferencing unit to another to request connection information. Referring to FIG. 4, an example of a request e-mail 400 for requesting connection information from a videoconferencing unit is illustrated. The request e-mail 400 is shown in memo style for convenience, but it is understood that the actual e-mail 400 includes source code in Hypertext Mark-up Language (HTML) or other suitable computer language, for example. In addition, the request e-mail 400 is shown requesting certain information in an exemplary format. The details and format are provided for illustrative purposes, and the request e-mail 400 can have any details and format commensurate with the teachings of the present disclosure.

The request e-mail 400 lists the e-mail address 402 of the videoconferencing unit (e.g. "unitA@serverA.com") that is the source and the e-mail address 404 of the videoconferencing unit (e.g. "unitB@serverB.com") that is the destination. The request e-mail 400 can also include a header line 406 that can provide some form of code or other indication for the receiving videoconference unit to recognize the type of request.

The request e-mail 400 also includes a message 410 requesting various pieces of information 420. For example, the requested information 420 includes a connection address, such as the ISDN address, IP address, SIP address, or number for an IP-to-IP Gateway, of the receiving videoconferencing unit. In addition, the requested information 420 can include encryption or authentication information that may be needed to establish a videoconference call with the receiving videoconferencing unit. This information can be formatted using various headers, tags, codes, or the like that will be recognized by the software of the various videoconferencing units. In addition, the requested information 420 may include various validation codes or the like recognized by the receiving videoconferencing unit and used to validate the request e-mail 400. Because the e-mail 400 is coded in HTML or other suitable computer language, the receiving videoconferencing unit has software capable of parsing and extracting information from the e-mail 400 and capable of processing the extracted information to validate and comply with the request.

Figure 5:
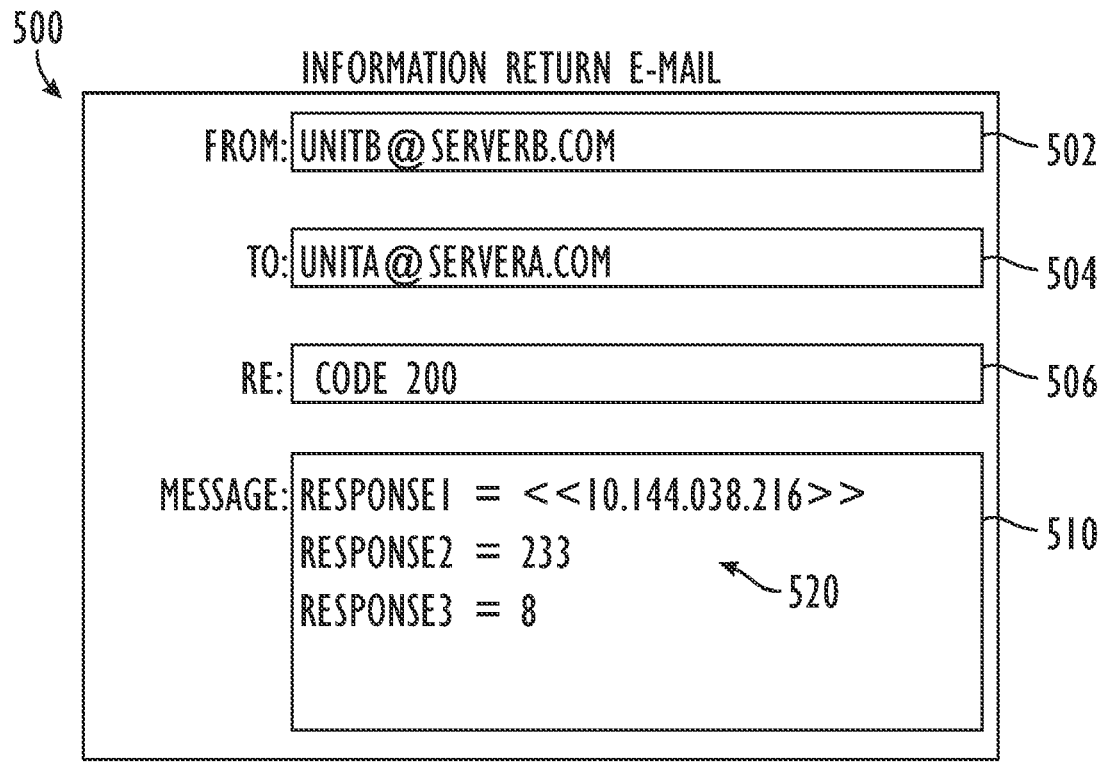
FIG. 5 illustrates an example of an e-mail returning connection information to a videoconferencing unit.

As discussed previously, a response e-mail is sent from one videoconferencing unit to another to return connection information for establishing a videoconference call. Referring to FIG. 5, an example of a response e-mail 500 returning connection information to a videoconferencing unit is illustrated. Again, the response e-mail 500 is shown in memo style for convenience, but it is understood that the actual e-mail includes source code in Hypertext Mark-up Language (HTML) or other suitable computer language, for example. In addition, the response e-mail 500 is shown returning certain information in an exemplary format. The details and format are provided for illustrative purposes, and the e-mail 500 can have any details and format commensurate with the teachings of the present disclosure.

As with the request e-mail (400; FIG. 4) discussed previously, the response e-mail 500 lists the e-mail address 502 of the source (e.g., "unitB@serverB.com") and the e-mail address 504 of the destination (e.g., "unitA@serverA.com"), which belongs to the videoconferencing unit that originally requested information. The response e-mail 500 can also include a header line 506 that can provide some form of code or the like for the receiving videoconferencing unit to recognize the type of returned information.

The response e-mail 500 also includes a message 510 containing various pieces of information 520 requested from the sending unit. For example, the information 520 includes a connection address, such as the ISDN address, IP address, SIP address, or number for an IP-to-IP Gateway, of the sending videoconferencing unit. In addition, the information 520 can contain encryption or authentication information that may be needed to establish a videoconference call with the sending videoconferencing unit. This encryption or authentication information can be formatted into various codes, indications, or the like recognized by the receiving unit. In addition, the information 520 may include various validation codes recognized by the receiving unit and used to validate the message 510. Because the response e-mail 500 is coded in HTML or other suitable computer language, the receiving unit has software capable of extracting information from the code and processing the extracted information to validate and comply with the request.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A first videoconferencing unit, comprising:
   one or more network interfaces for sending and receiving e-mails and for establishing videoconference calls over one or more networks;
   an e-mail application automatically generating one or more outgoing request e-mails requesting connection information and sending the outgoing request e-mails to one or more e-mail addresses of one or more second videoconferencing units with at least one of the network interfaces, the e-mail application obtaining connection information from one or more incoming response e-mails received from the e-mail addresses of the second videoconferencing units; and
   a videoconference application initiating one or more videoconference calls via at least one of the network interfaces using received connection information.

2. The unit of claim 1, comprising a user interface receiving one or more e-mail addresses of one or more second videoconferencing units and providing received e-mail address to the e-mail application, wherein the e-mail application uses received e-mail addresses to automatically generate the one or more outgoing request e-mails.

3. The unit of claim 2, wherein the user interface comprises an address book function accessing a database storing one or more e-mail addresses of one or more second videoconferencing units.

4. The unit of claim 1, further comprising a database having connection information of the videoconferencing unit, wherein
at least one of the network interfaces receives an incoming request e-mail from a requesting videoconferencing unit, the request e-mail requesting connection information from the first videoconferencing unit, and
the e-mail application automatically obtaining requested connection information from the database in response to the incoming request e-mail and automatically constructing an outgoing response e-mail for sending to the requesting videoconferencing unit, the outgoing response e-mail including the e-mail address of the first videoconferencing unit as a source, the e-mail address of the requesting videoconferencing unit as a destination, and obtained connection information.

5. The unit of claim 4, wherein the e-mail application includes an authentication algorithm authenticating the incoming request e-mail received from the requesting videoconferencing unit.

6. The unit of claim 1, wherein the connection information comprises an Integrated Services Digital Network address, an Internet Protocol address, a Session Initiation Protocol address, or a number for an IP-to-IP Gateway.

7. The unit of claim 6, wherein the connection information further comprises encryption information associated with the sending videoconference unit.

8. A videoconferencing method, comprising:
receiving one or more e-mail addresses associated with one or more videoconferencing units;
automatically generating one or more outgoing request e-mails requesting connection information from one or more of the videoconferencing units;
sending one or more of the outgoing request e-mails to one or more of the e-mail addresses;
receiving one or more incoming response e-mails from one or more of the videoconferencing units,
automatically obtaining requested connection information from one or more of the incoming response e-mails; and
initiating one or more videoconference calls with one or more of the videoconference units using obtained connection information.

9. The method of claim 8, wherein receiving one or more e-mail addresses associated with one or more videoconferencing units comprises receiving the one or more e-mail addresses as user input, or accessing a database storing the one or more e-mail addresses.

10. The method of claim 8, wherein automatically configuring one or more outgoing request e-mails requesting connection information comprises automatically coding the one or more outgoing request e-mails by including one or more indications of requested connection information.

11. The method of claim 8, wherein automatically obtaining requested connection information from the one or more incoming response e-mails comprises:
parsing the one or more incoming response e-mails;
reading e-mail addresses from the parsed e-mails; and
reading connection information associated with the e-mail addresses from the parsed e-mails.

12. A first videoconferencing unit, comprising:
a database storing videoconferencing connection information of the first videoconferencing unit;
one or more network interfaces for sending and receiving e-mails and for establishing videoconference calls over one or more networks;
an e-mail application communicatively coupled to the database and the network interfaces, the e-mail application configured to:
receive at least one incoming request e-mail from at least one second videoconference unit requesting the connection information of the first videoconferencing unit,
obtain the connection information from the database,
obtain an e-mail address of the at least one second videoconference unit from the incoming request e-mail,
automatically generate at least one outgoing response e-mail including obtained connection information, and
send the at least one outgoing response e-mail to the e-mail address of the at least one second videoconferencing unit; and
a videoconference application communicatively coupled to the one or more network interfaces and establishing a videoconferencing connection upon detection of an incoming videoconferencing call from the at least one second videoconferencing unit.

13. The unit of claim 12, wherein to automatically generate at least one outgoing request e-mail, the e-mail application constructs the at least one outgoing request e-mail to include the e-mail address of the first videoconferencing unit as a source, the e-mail address of the at least one second videoconferencing unit as a destination, and one or more indications of requested connection information.

14. The unit of claim 12, wherein the e-mail application is further configured to authenticate the at least one incoming request e-mail received from the at least one second videoconferencing unit using an authentication algorithm.

15. The unit of claim 12, wherein the connection information comprises an Integrated Services Digital Network address, an Internet Protocol address, a Session Initiation Protocol address, or a number for an IP-to-IP Gateway.

16. The unit of claim 15, wherein the connection information further comprises encryption information associated with a sending videoconference unit.

17. The unit of claim 12, wherein the e-mail application is further configured to:
automatically generate at least one outgoing request e-mail requesting connection information from at least one other videoconferencing unit,
send the at least one outgoing request e-mail to the at least one other videoconferencing unit with at least one of the network interfaces,
obtain connection information from at least one incoming response e-mail received from the at least one other videoconferencing unit, and
provide the obtained connection information to the videoconference application,
wherein the videoconference application initiates a videoconference call with the at least one other videoconferencing unit using the obtained connection information.

18. The unit of claim 17, further comprising a user interface receiving at least one e-mail address of the at least one other videoconferencing unit and providing the at least one e-mail address to the e-mail application, wherein the e-mail application uses the received e-mail address to automatically generate the at least one outgoing request e-mail.

19. The unit of claim 18, wherein the user interface comprises an address book function accessing a database storing one or more e-mail address of one or more other videoconferencing units.

20. A videoconferencing method, comprising:
receiving, at a first videoconferencing unit, one or more incoming request e-mails from one or more e-mail address, the incoming request e-mails requesting connection information for establishing a videoconference with the first videoconferencing unit;
obtaining requested connection information;
automatically generating one or more outgoing response e-mails including obtained connection information in parseable form;
sending the outgoing response e-mail to the e-mail address;
detecting one or more incoming videoconference calls from one or more second videoconferencing units; and
connecting with the one or more incoming videoconference calls when detected.

21. The method of claim 20, wherein the connection information comprises an Integrated Services Digital Network address, an Internet Protocol address, a Session Initiation Protocol address, or a number for an IP-to-IP Gateway for the first videoconferencing unit.

22. The method of claim 21, wherein the connection information further comprises encryption information associated with first videoconferencing unit.

* * * * *

UNITED STATES PATENT AND TRADEMARK OFFICE
CERTIFICATE OF CORRECTION

PATENT NO. : 7,589,757 B2  Page 1 of 1
APPLICATION NO. : 11/277967
DATED : September 15, 2009
INVENTOR(S) : Alain Nimri It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Twenty-first Day of September, 2010

David J. Kappos
*Director of the United States Patent and Trademark Office*